April 21, 1931. W. J. STOVER 1,802,225
GRAPE HULLER
Filed March 5, 1928  5 Sheets-Sheet 5
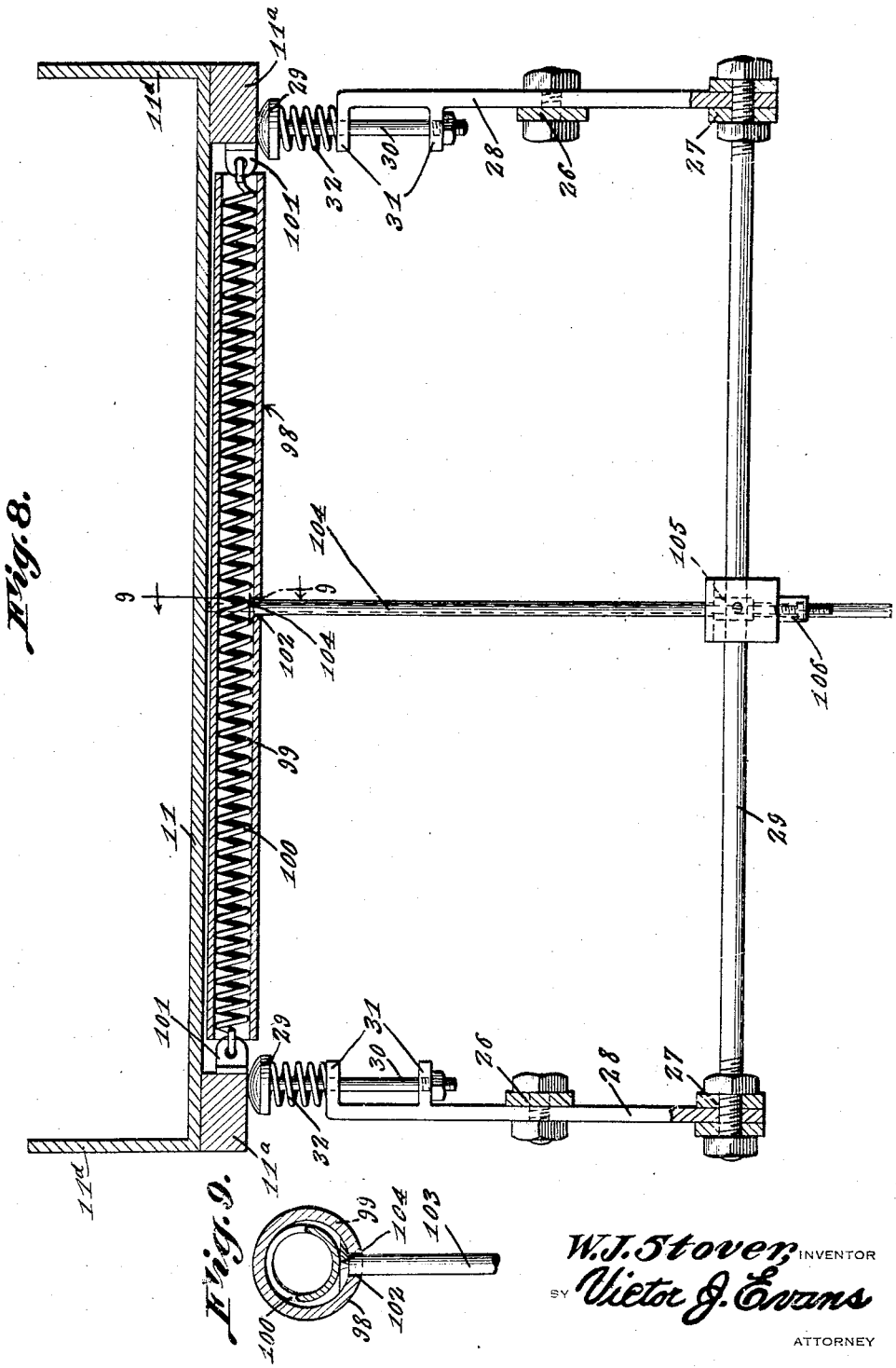

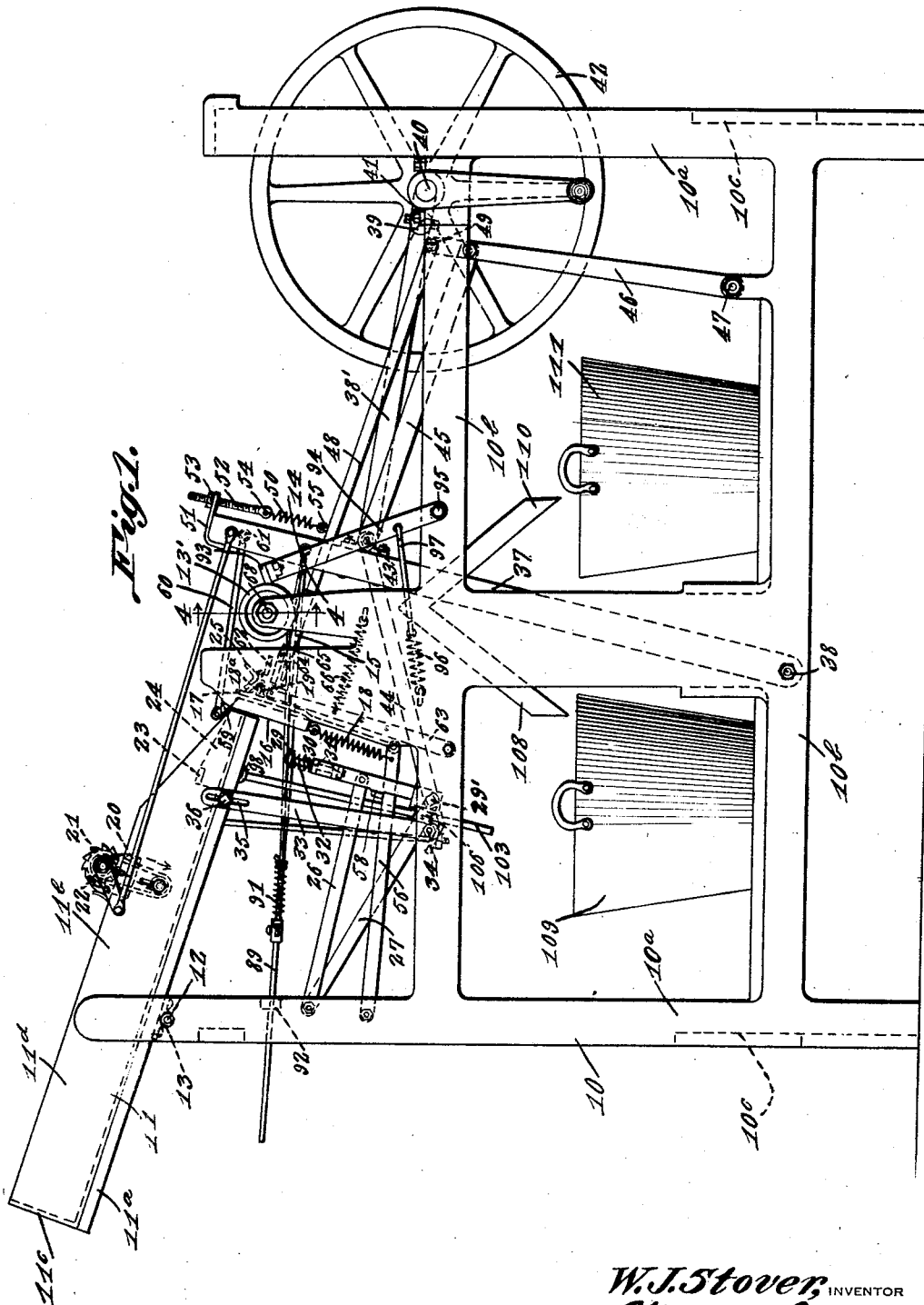

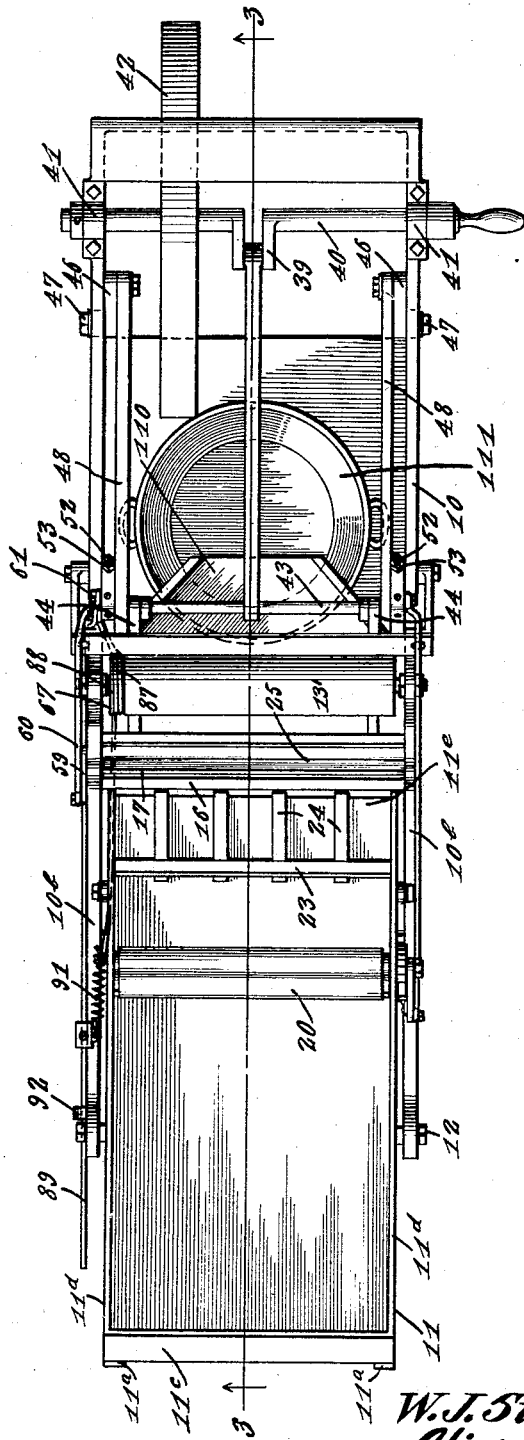

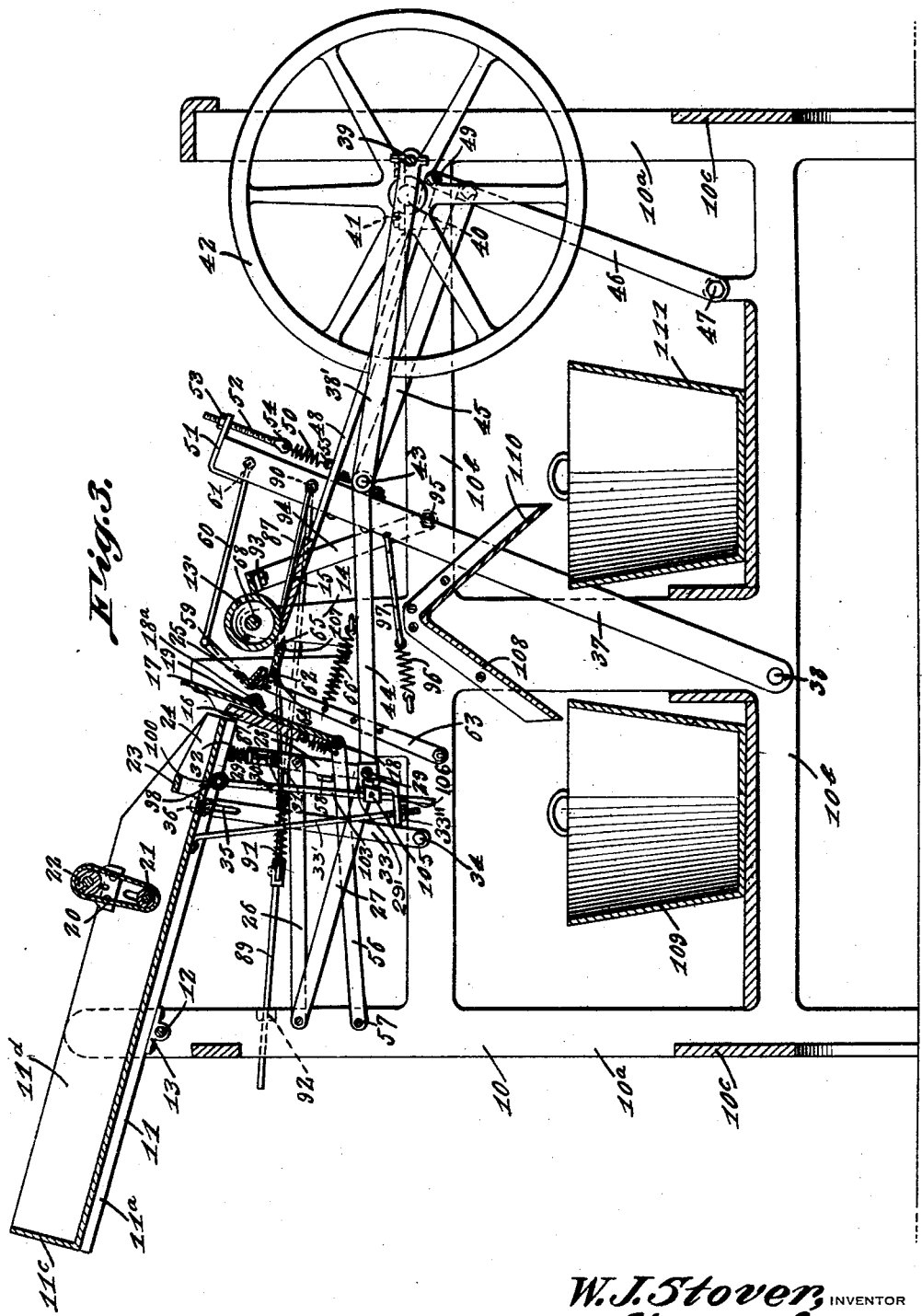

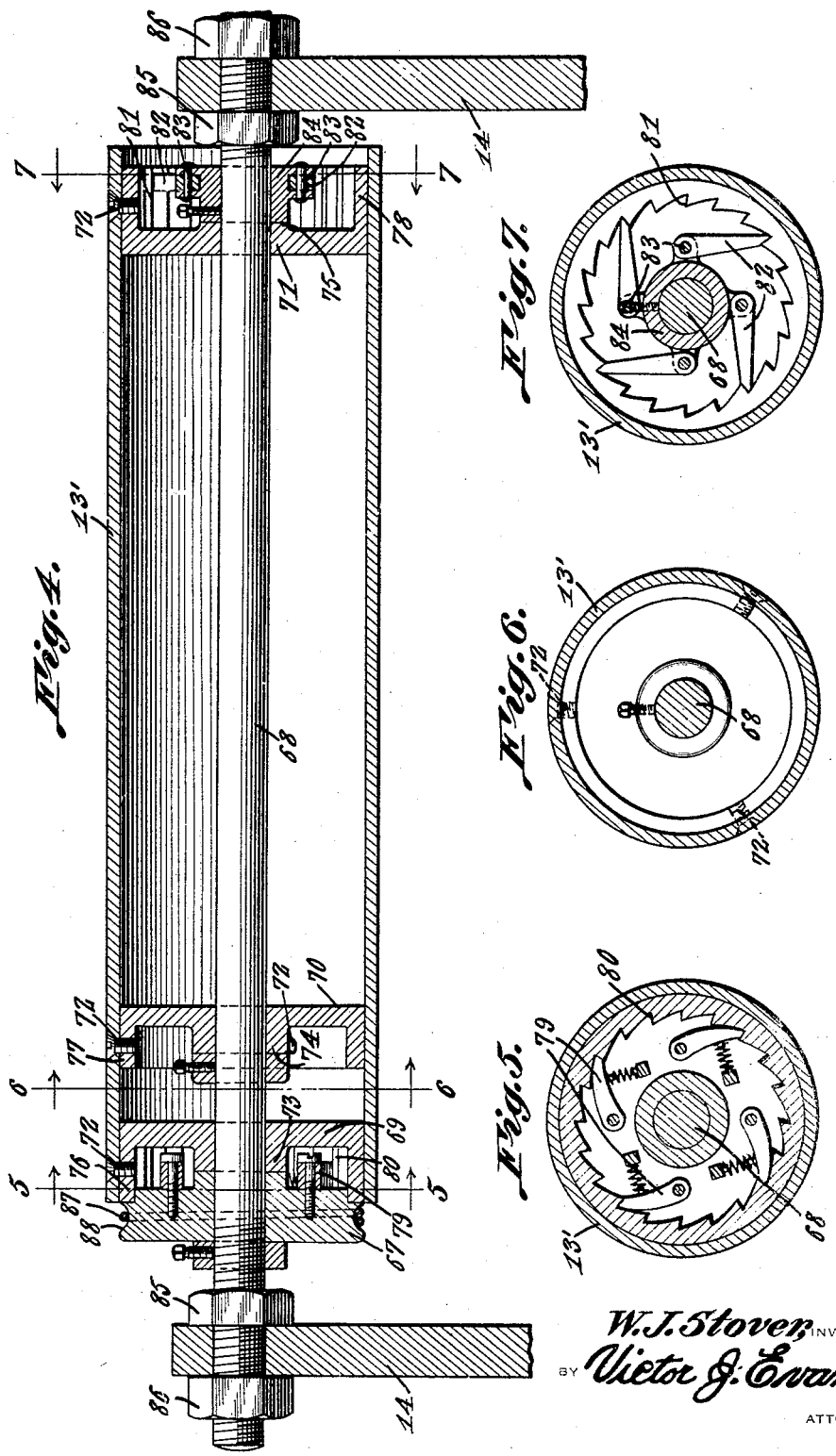

Patented Apr. 21, 1931

1,802,225

UNITED STATES PATENT OFFICE

WILLIAM J. STOVER, OF FRUITLAND PARK, FLORIDA

GRAPE HULLER

Application filed March 5, 1928. Serial No. 259,251.

The present invention relates to machines for separating the hulls from the pulp of grapes and has for an object to provide a mechanism that will effectively and economically operate for this purpose.

Further objects are to provide in a machine of this character effective feeding mechanism whereby the grapes will be fed to the hulling mechanism, periodically presenting a single line of grapes to said hulling mechanism, and preventing other grapes from being fed thereto until the operation on the said line has been completed.

The mechanism by means of which the above objects are accomplished comprises in its broad essentials a tiltable inclined hopper upon which the grapes are placed, adjacent the lower open end of which is placed a cylinder beneath which is a movable pressure plate.

A gate is positioned between the open end of the hopper and the roller which is opened through suitable mechanism in timed relation to the cylinder and hopper for permitting the grapes to be delivered onto the pressure plate. Tilting beams are provided connected with a suitable drive shaft and through these beams all the mechanism of the machine is driven.

Further objects of the invention are to provide means for preventing stagnation of grapes in the hopper and for keeping them moving uniformly toward the delivery end thereof.

Still further objects are to provide for the breaking of the hulls of the grapes before subjecting them to pressure, and to insure against the hulls and pulp being delivered to the same receptacle.

In the drawings:—

Figure 1 is a side elevation of a machine constructed in accordance with my invention.

Figure 2 is a plan view of the same.

Figure 3 is a longitudinal section on the line 3—3 of Figure 2 showing the relation of the various parts of the machine.

Figure 4 is an enlarged detail view in section on the line 4—4 of Figure 1 showing the construction of the hulling cylinder.

Figure 5 is a section on line 5—5 of Figure 4 and showing the ratchet connection between the drive pulley and the cylinder.

Figure 6 is a section on line 6—6 of Figure 4 showing the connection of the supporting web to the cylinder and to the supporting shaft.

Figure 7 is a section on line 7—7 of Figure 4 showing the pawl and ratchet connection between the shaft and cylinder for preventing backward movement of the hulling cylinder.

Figure 8 is a section on line 8—8 of Figure 1 showing certain details of construction by which the fruit is kept moving in the hopper.

Figure 9 is a section on line 9—9 of Figure 8 showing the connection between the actuating rod and the above mentioned means for keeping the fruit in motion.

Referring to the drawings in detail, 10 designates the frame of the machine which comprises upright supporting members 10a and longitudinally extending beams 10b and cross members 10c with other suitable bracing and supporting structures.

Mounted upon the frame is a hopper 11 which comprises a frame 11a and a trough 11b closed at its rear end 11c and sides 11d, but being left open at its forward end 11e, the forward ends of the side members 11b being cut off at an angle to the upper edge thereof, and the cut off edges converging with the bottom of the hopper. The hopper is pivotally mounted between uprights 10a at the rear of the frame by means of a rod 12 journaled in suitable bearings 13 secured to the bottom of the hopper. The forward end of the hopper is supported by a certain link construction which will hereinafter be described.

Adjacent the open or discharge end of the hopper is mounted a cylinder 13' rotatably supported by bracket arms 14 extending upwardly from the frame 10, the cylinder being in co-operative relation with a pressure plate 15 in contact therewith on its lower side and in slidable relation thereto. Extending transversely of the frame and lying in a plane at an angle to the vertical and adjacent the discharge end of the hopper is a stationary wall 16 having its upper edge sloping downwardly in the direction of the roller 13, the hopper being adapted to be tilted on its axis by suitable mechanism hereinafter described to bring the discharge end below the upper edge of the wall 16 or in alignment therewith alternately as the machine operates in the process of hulling grapes or the like.

In order that the grapes may be delivered from the hopper to the hulling mechanism in a uniform, constant stream and in periodic groups so that the hulling of each group may be completed before another group is presented, the machine is provided with the following mechanism: Slidably mounted upon the wall 16 and on the side thereof toward the roller 13 is a gate 17 preferably of sheet metal which is yieldably held in its closed position by means of a spring 18 and is guided in its sliding movement by means of a bracket 18a V-shaped in cross section which is provided between the converging walls with ball or roller bearings 19 to facilitate the sliding movement of the gate.

The hopper is provided with an endless belt 20 trained about spaced rollers 21 and 22 adjustable relative to the bottom of the hopper in order to accommodate the same to various sized fruit and the forward end of the trough is provided with a cross beam 23 spanning the upper ends of spaced blocks 24 which extend longitudinally of the discharge end of the hopper in order to present the grapes uniformly at the gate 17. Between the gate and the hulling mechanism is provided a trough 25 V-shaped in cross section and adapted to receive from the hopper a single line of grapes, said trough extending transversely of the machine. The trough is shown in Fig. 1 of the drawings in position to receive the line of grapes which have lodged between the sloping upper edge of the wall 16 and the gate 17. Figure 3 shows the trough in position to discharge said grapes to the hulling mechanisms.

Pivotally connected to the frame of the machine by means of supporting links 26 and 27 are lift bars 28 connected together by a cross bar 29 and adapted to be raised and lowered through certain link connections, hereinafter to be described, for raising and lowering the discharge end of the hopper 11 respectively to position in alignment of the upper edge of the wall 16 as shown in Figure 3 and to a position below the upper edge as shown in Figure 1. The contact of the upper end of the bars 28 with the hopper is cushioned by means of heads 29 secured to rods 30 slidably mounted in ears 31 formed on the arms, 28, the cushioning function being effected through compression springs 32 mounted between the head and the uppermost of the ears 31. The hopper is limited in its pivotal movement by means of links 33 pivotally secured to the frame at their lower ends by bolts 34 and provided at their upper ends by slots 35 in which are slidably mounted suitable connecting means as bolts 36 connected with the hopper.

The operation of the various mechanical elements described above is effected through rocker beams 37 pivotally mounted on the frame by means of bolts 38 and having a swinging movement toward and from the gate 17 controlling the discharge end of the hopper. The angular movement of the rocker beams is effected through a link 38' connected to the crank arms 39 of a shaft 40 journaled transversly of the frame in suitable bearings 41, the shaft 40 having the usual fly wheel 42 secured thereupon and the link 38 being connected intermediate of the rocker beams to a transverse rod 43 secured to said rods toward, but spaced from the upper ends thereof. The lift bars 28 are connected with the rocker beams by means of links 44 pivoted at their ends respectively to the lift bars and to the rocker beams. The pressure plates 15 are connected with the rocker beams through links 45 pivotally connected at their ends to the rocker beams and to suitable supporting arms 46 pivotally mounted upon the frame 10 by bolts as at 47, the pressure plate 15 being connected with the supporting arms by means of rods 48 pivotally connected to the upper ends of said arms by bolts 49 and held in tangential contact with the rollers 13 by means of springs 50 adjustably secured to brackets 51 by means of screw bolts 52 held in adjusted position by nuts 53, the springs being connected with eyes 54 at the lower ends of said bolts and similarly at 55 secured to the rods 48. The lower end of the gate 17 is pivotally connected with one end of links 56, the opposite end of said links being pivotally connected with the frame as at 57 and the lifting bars 28 are provided with lugs 58 which extend over the links 56 and are adapted to contact therewith in the downward movement of the lift bars for opening gate 17 to release a line of fruit deposited upon the upper edge of the wall 16. As the gate opens, the trough 25 is presented in position to receive the grapes, said trough being directed in its movements through arms 59 secured thereto and pivotally connected to links 60 which are in turn connected at their opposite ends to the rocker beam 37 as shown at 61. The trough 25 is pivotally mounted upon a bridge member 62 extending transversely of the frame and secured to said frame at its respective ends. Rocker arms 63 are pivotally secured to the frame and are provided at their upper ends with a feed plate 64 having a knife 65 secured in the edge thereof, toward the pressure plate 15. The arms 63 are normally yieldably maintained in their rearward position by means of springs 66 secured at their ends to the arms and to the frame. The cylinder 13 is driven through a pulley 67 rotatably mounted on the shaft 68 supported by the arm 15, said shaft 68 also constituting the support for the cylinder, the cylinder being rotatably connected therewith by means of webs 69, 70 and 71 connected to the cylinder by screws 72 and rotatably mounted upon the shaft, each of the webs being provided with hub members 73, 74 and 75 respectively and with circumferential flanges 76, 77 and 78. The pulley and the cylinder are both loosely mounted on the shaft 68 for rotation relative thereto and the pulley is in driving connection with the cylinder through spring pressed dogs 79 and a ratchet 80 internally arranged and rigidly connected with the flange 76 of the web 69 secured to the cylinder.

The movement of the cylinder is in anti-clockwise direction and backward movement of the cylinder is prevented by a lock ratchet 81 formed internally of the flange 78 which co-operates with dogs 82 hingedly secured at 83 to a collar 84 which in turn is rigidly secured to the shaft 68, the shaft being held against rotation by lock nuts 85 and 86 located on either side of the supporting brackets 14. The pulley 67 is driven by a belt 87 wound thereabout and lying in the grooved periphery 88 thereof. The ends of the belt are connected with a rod 89 which is slidably mounted upon the frame and is connected at one end with the rocker beam 37 as at 90. The belt is yieldably attached by means of a spring 91 to the rod intermediate of its ends and the opposite end thereof is connected to the pivotal connection 90 between the rod and the rocker beam. The sliding connection between the rod 89 and the upright supporting members 10a is designated at 92.

Associated with the cylinder 13 is a scraper member 93 secured to arms 94 pivoted to the frame at 95 and held in yieldable engagement with the roller by means of the springs 96 secured at one end to the frame and at the other end to links 97 which are pivotally connected with the arms 94.

Adjacent the discharge end of the hopper 11 and mounted between the side frame 11a thereof is a bumper device 98 comprising a rubber tube 99 having in its bore a spring 100, the ends of which are connected with ears 101 secured to the side frame 11a. Centrally of the tube 99 is an aperture 102 through which a rod 103 projects, the end of the rod interiorly of the tube being provided with a head 104 to prevent disconnection thereof from the tube.

Adjacent the lower end of the rod is provided a trip lug 105 lying in the path of a finger 106 secured to the link 27 so that with each operation of the link, and movement downward of the members 28, the rod 103 will be given a downward pull and will be suddenly released causing a bumping action of the tube 99 against the under side of the hopper and in this manner preventing stagnation of the progress of the grapes in their downward course toward the gate 17. As the grapes are fed from the trough 25 over the feed plate 64, the knife 65 is moved against the action of spring 66 and such action being caused by pressure of the member 15 against the lug 107 secured to the under side of the members 64. The knife contacts with the grapes cutting the skin thereof and the grapes are then drawn under the roller by the rotation of the roller and the pulp squeezed out, said pulp falling down on the feed side of the roller and dropping on the inclined chute 108 into the receptacle 109. The hulls are carried under the roller and are scraped off by the blade 93 and are similarly deposited on the inclined chute 110 and are directed into the receptacle 111, thus the hulls and pulps are separated from each other and are directed into different vessels.

The operation of the machine is as follows: Grapes are dumped into the hopper 11 and gravitate toward the discharge end thereof, the endless belt 20 revolving in a clockwise direction has a tendency to move the grapes rearwardly allowing only the single lower layer to progress therebeyond to the discharge end. The grapes are separated by the blocks 24 and are delivered against the wall 16. As the crank shaft 40 revolves, the discharge end of the hopper is moved upwardly to alignment with the upper edge of the wall 16 which is of a thickness to receive and support a single line of grapes only thereupon, the forward side of the grapes resting against the gate 17 which is in closed position as shown in Figure 3. As the crank shaft rotates further, the discharge end of the hopper is moved downwardly to prevent more than the single line of grapes being delivered to the trough 25.

At a suitable time, the gate 17 is drawn downward by means of the lugs 58 on bars 28 pressing the arms 56 downward and the line of grapes so held on the upper edge of the wall 16 are delivered into the trough 25 and the gate is again allowed to close under the influence of the spring 28. The grapes are then delivered by the trough onto the member 64, being held between the converging elements presented by the lower portion of cylinder 13' and plate 64, assumed to have moved from the position of Fig. 3 to the left, and as the shaft further revolves, the arm 48 is moved forward carrying the pressure plates 15 under the knife carried by the member 64 and permitting the knife to cut a slit in each grape of the line presented. The cutting or slitting movement is produced under the tension of springs 66 which draw the knife 65 to the right in Figures 1 and 3. The grapes are then drawn between the roller and the pressure plate 15 and the pulp squeezed out in the manner indicated above, the hulls passing under the roller and the roller being prevented by the dogs 82 from a rearward movement due to the back movement of the rod 89 and the belt 87 connected therewith, the pulps dropping down because pressure plate 15 now moves to the right, providing an opening under cylinder 13', the pulps passing into the receptacle 109 and the hulls dropping down and being deposited into the receptacle 111.

In the manner above described, a single line of grapes is operated on at a time and a second line is prevented from delivering to the roller until the operation of the first line has been completed.

It should be added that bar 33 governs the position of the hopper, insuring perfect delivery of the grapes, and that a wire or the like 33', secured to the hopper, slides freely through an eye of the finger 106 carried by crossbar 29. The eye portion, on the downward movement, engages adjustable element 33'' on wire 33', and trips the latch 29' of element 29 from the lug 105, permitting the quick movement at this point, before referred to.

Having described my invention what I claim is:—

1. In a grape hulling machine, a rotatable cylinder, hull cutting means movable transversely of the axis of the cylinder and beneath the latter, a pressure plate, and means for moving this plate toward and away from the cutting device and beneath the cylinder.

2. In a grape hulling machine, hulling mechanism comprising a cylinder, a pressure plate in tangential relation thereto, hull cutting means reciprocable toward the pressure plate, means for periodically rotating said cylinder, means for preventing back movement thereof and means for delivering the grapes to said hulling mechanism.

3. A machine for hulling grapes, comprising a hopper having an open discharge end, hulling mechanism in spaced relation and adjacent said discharge end, said hulling mechanism comprising a movable pressure plate and a cylinder rotatably mounted in tangential relation to said plate, means for controlling the discharge end of said hopper, a trough for receiving a single line of grapes from said hopper and delivering the same to said hulling mechanism, and means for operating the trough, cylinder and pressure plate in timed relation to each other.

4. In a device of the character described, a sloping hopper having an open discharge end and means for controlling the discharge of fruit from the end of said hopper, a cylinder spaced from said discharge end and a pressure plate co-operating therewith, a pulley associated with said cylinder and a belt surounding said pulley, a rod slidably mounted on the frame of said device, the ends of said belt being connected with the rod, means for moving said rod horizontally of the device and means for operating the control means in timed relation thereto.

In testimony whereof I affix my signature.

WILLIAM J. STOVER.